US012699277B2

(12) United States Patent (10) Patent No.: US 12,699,277 B2
Hirwa et al. (45) Date of Patent: Aug. 4, 2026

(54) ADAPTIVE FEEDBACK CONTROL OF AN OPTRONIC SIGHT

(71) Applicant: SAFRAN ELECTRONICS & DEFENSE, Paris (FR)

(72) Inventors: Serge Hirwa, Paris (FR); Arnaud Quadrat, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 563 days.

(21) Appl. No.: 18/246,577

(22) PCT Filed: Sep. 24, 2021

(86) PCT No.: PCT/FR2021/051652
§ 371 (c)(1),
(2) Date: Mar. 24, 2023

(87) PCT Pub. No.: WO2022/064157
PCT Pub. Date: Mar. 31, 2022

(65) Prior Publication Data
US 2023/0341701 A1 Oct. 26, 2023

(30) Foreign Application Priority Data

Sep. 25, 2020 (FR) ...................................... 2009793

(51) Int. Cl.
*G02B 27/64* (2006.01)
(52) U.S. Cl.
CPC .................................. *G02B 27/644* (2013.01)
(58) Field of Classification Search
CPC ............ G02B 27/644; F41G 3/22; G05B 6/02
See application file for complete search history.

(56) References Cited

U.S. PATENT DOCUMENTS 5,868,031 A 2/1999 Kokush et al.
2004/0173726 A1 9/2004 Mercadal et al.
(Continued)

FOREIGN PATENT DOCUMENTS

WO 2019/153263 A1 8/2019

OTHER PUBLICATIONS

France Search Report and Written Opinion mailed May 28, 2021, issued in Application No. FR2009793, filed Sep. 25, 2020, 6 pages.
(Continued)

*Primary Examiner* — Thien M Le
*Assistant Examiner* — Asifa Habib
(74) *Attorney, Agent, or Firm* — CHRISTENSEN O'CONNOR JOHNSON KINDNESS PLLC

(57) ABSTRACT

An optronic sight for a motorized vehicle such as an aerial or marine vehicle propelled by a propeller, or a tracked land vehicle. The optronic sight can include an aiming module, means for moving the aiming module about the first and second axes, and means for continuously measuring angular data. The optronic sight can further include a feedback control loop having means for continuously measuring the acceleration of the aiming module in three orthogonal directions of the space, means for detecting at least one fundamental frequency of the vibratory disturbances, and an adaptive corrector configured to continuously receive as input said fundamental frequency, a discrepancy between an angular setpoint value and said angular data, output a movement setpoint value to the moving means.

9 Claims, 2 Drawing Sheets

(56) References Cited

U.S. PATENT DOCUMENTS

| 2015/0264262 A1 | 9/2015 | McClatchie |
| 2017/0175948 A1 | 6/2017 | Zeise et al. |
| 2018/0135798 A1* | 5/2018 | Griffin .................... G05B 6/02 |
| 2021/0041772 A1* | 2/2021 | Xie ........................ G01H 1/003 |

OTHER PUBLICATIONS

International Search Report mailed Feb. 9, 2022, issued in corresponding International Application No. PCT/FR2021/051652, filed Sep. 24, 2021, 6 pages.

Written Opinion mailed Feb. 9, 2022, issued in corresponding International Application No. PCT/FR2021/051652 filed Sep. 24, 2021, 5 pages.

* cited by examiner

ADAPTIVE FEEDBACK CONTROL OF AN OPTRONIC SIGHT

CROSS-REFERENCES TO RELATED APPLICATIONS

This application is a National Stage of International Application No. PCT/FR2021/051652, filed Sep. 24, 2021, which claims priority to French Patent Application No. 2113772, filed Sep. 25, 2020, the entire disclosures of which are hereby incorporated by reference in their entirety for all purposes.

TECHNICAL FIELD

Embodiments of the disclosure relate to the feedback control of an optronic sight for a motorized vehicle such as a propeller-driven aircraft, a propeller-driven boat or a tracked vehicle.

BACKGROUND

An optronic sight 2 consists of a set of cameras and/or pointing devices, called aiming module 4. This aiming module 4 is placed on a support 6 of a motorized vehicle and can move according to two axes 8a, 10. The line of sight 12 of the optronic sight 2 refers to the optical axis emerging from one of these sensors. The purpose of the optronic sight 2 is to orient the line of sight 12 towards a target regardless of the movements of the motorized vehicle and/or of the target, and regardless of the external environment (atmospheric conditions, etc.). To this end, the aiming module 4 includes means 14 for continuously measuring angular data, i.e. a gyrometer 14 in the case of measurement of the angular speed or a gyroscope 14 for measuring the angular position of the line of sight 12 as illustrated in FIG. 1.

The rotational speed of the rotor and the blades of a helicopter or the engine speed of propeller-driven planes, propeller-driven boats or tracked vehicles generate vibratory disturbances which deteriorate the stabilization of the line of sight 12 of the optronic sights 2. It is then necessary to set up a process allowing accurately stabilizing the image and therefore in particular to correct the angular data (angular speed or position) of the line of sight 12 thanks to a corrector 15. Afterwards, this correction is made by means of control means 16 of the moving means 17a, 17b which may comprise gimbals actuated by motors.

To reject the vibratory disturbances acting on the aiming module 4 and thus make the line of sight 12 fixed in an inertial frame, it is therefore necessary that the sum of the torques, i.e. the motor torque $C_{mot}$ and the friction torque $C_f$ due to the bearings of the gimbals, applied to the aiming module 4 is zero.

For this purpose, it is conventionally known to use a feedback control loop 20 capable of acting on the angular data (speed or position) of the line of sight 12 as illustrated in FIG. 2. Each block of the feedback control loop 20 may be designed as a system, i.e. a set of relationships relating inputs and outputs which may be explained using a transfer function.

Hence, the purpose of the feedback control loop 20 is to enable the motors to generate a torque $C_{mot}$ which compensates in particular for the friction torque $C_f$ at the motor-driven gimbals to stabilize the angular orientation of the line of sight, when an aircraft carrying the sight moves angularly. We will then talk about a transfer function $H_{mot}$ between a voltage u and a torque $C_{mot}$. The setpoint u of the motors is generated by the output of a corrector K. This feedback control loop is intended to make the output y tend towards a reference $y_{ck}$, although the motors and gimbals are subject to disturbances due to the rolling of the gimbals $C_f$ and the angular disturbance $\delta_y$.

Thus, the feedback control function of the line of sight of the optronic sight 2 will be developed in more detail. The latter is split into two portions: an analog portion 22 and a digital portion 24. First of all, in the analog portion 22, the spectral lines associated with the disturbing vibrations $\gamma_{vib}$, generated by the rotation of the rotor and the blades of a helicopter are identified and filters set on these spectral lines will then be constituted. Thus, the transfer function $H_{vib}$ allows modeling the impact of the disturbing vibrations $\gamma_{vib}$ on the angular orientation of the line of sight. Hence, at the output of the transfer function, the angular disturbance $\delta_y$ of the line of sight due to the disturbing vibrations $\gamma_{vib}$ is obtained which can thus be considered in the feedback control loop of the optronic sight. Hence, this control method is based on a priori knowledge of a model of the studied system.

Afterwards, another step consists in modeling the dynamics of the angular data (angular position or speed) of the line of sight by a transfer function called $H_{gyro}$. This transfer function is based either on the measurement y of the position of the line of sight by means of a gyroscope, or on the measurement y of the angular speed of the line of sight obtained by a gyrometer or more specifically by the inertial sensor of the gyrometer. Henceforth, the measurement of the angular data of the obtained line of sight $y_m$ then passes through an Analog-to-Digital Converter (ADC) and is thus sampled to become the sampled measurement $y_{mk}$. A feedback control error $\varepsilon_k$ is then obtained by the difference between a reference $y_{ck}$ and the sampled measurement $y_{mk}$. This feedback control error $\varepsilon_k$ is then input into a linear and time-invariant corrector K. The latter is calculated in order to compensate for the disturbing vibrations $\gamma_{vib}$ whose fundamental frequency $f_v$ is fixed over time. The software implementation of the corrector K is done in the form of a combination (sum and/or product) of second-order digital linear filters. At the output of this corrector is obtained a digital motor command $u_k$ which is afterwards transformed into an analog command u (voltage) by a Digital-to-Analog Converter (DAC). This analog command u is applied to the electric motor, modeled by the transfer function $H_{mot}$, which consequently delivers an electromechanical torque. Thus, it allows obtaining the electromechanical torque $C_{mot}$ to be supplied by the motor to turn the gimbals. The greater the error $\varepsilon_k$, the higher the torque $C_{mot}$ supplied by the motors will have to be in order to reduce this error. The electromechanical torque $C_{mot}$ supplied by the motor actuates the gimbals modeled by the transfer function $H_{cardan}$, in order to compensate for/cancel the error $\varepsilon_k$. This error is due on the one hand to the disturbing torque of frictions in the bearings of the gimbals and on the other hand to the angular disturbance $\delta_y$.

As regards aerial vehicles or propeller-driven aircrafts, propeller-driven boats or tracked vehicles, there is currently no effective solution for such motorized vehicles including, in operation, variations in engine speed or variations in the vibration frequencies generated by the tracks. Indeed, variations in engine speed induce a spectrum of vibrations with specific spectral lines whose fundamental frequency varies with the engine speed and which requires the use of correctors adapting to these variable frequencies.

In other words, there is no corrector allowing compensating for the angular movements of the line of sight due to the linear vibrations of the aircraft carrying the sight, when these vibrations have a spectrum with lines at variable frequencies. These angular movements may result from a deformation of the mechanics which are not infinitely rigid. It consists of a point of view of the line of sight with slight rotations at high frequency which induce a blur on the image obtained by a camera, even though in average value the line of sight actually points in the same direction. Hence, it is necessary to determine a feedback control loop guaranteeing some stability over an a priori predefined domain of variable frequencies associated with the vibrations of the aircraft. This determination should be made in real-time, i.e. in operation.

Embodiments of the disclosure aim to remedy the aforementioned drawbacks, in a simple, reliable and inexpensive manner.

SUMMARY

To this end, embodiments of the disclosure relate to an optronic sight for a motorized vehicle such as an aerial or marine vehicle propelled by a propeller or a tracked land vehicle comprising an aiming module able to be moved about a first axis and a second axis not parallel to the first axis, means for moving the aiming module about the first and second axes, means for continuously measuring an angular data of the module about the first and second axes, the optronic sight being characterized in that it comprises a feedback control loop comprising: means for continuously measuring the acceleration of the aiming module according to three orthogonal directions of the space, means for detecting at least one fundamental frequency of the vibratory disturbances generated by the operation of the motorized vehicle, this frequency being obtained based on the output data of the acceleration measuring means, an adaptive corrector configured to continuously receive as input the fundamental frequency, a discrepancy between an angular setpoint value and the angular data, and to output a movement setpoint value to the moving means.

By motorized machine, it should be herein understood that it consists of a vehicle generating in operation a spectrum of vibrations containing lines whose frequencies could vary during use.

Thus, the adaptive corrector varies according to the fundamental frequency of the spectrum of the lines of the disturbing vibrations, while guaranteeing the stability of the feedback control loop. This adaptive corrector allows automatically adapting in real-time the frequencies of the selector filter to be used to eliminate the vibratory disturbances due to the operation of the motorized vehicle. The vibrations correspond to slight rotations at high frequencies which induce a blur on the image obtained by a camera, even though in average value the line of sight points in the same direction. A more robust inertial stabilization of the line of sight, the maximum of performance and good robustness margins of the warning loop are therefore obtained. Furthermore, thanks to its design, the adaptive corrector can be used on several motorized vehicles. Only the frequencies specific to the motorized vehicle should be provided to the adaptive corrector, without any additional setting to be performed. In practice, this represents a significant time saving.

The means for continuously measuring the angular data may include a gyroscope able to obtain an angular position or a gyrometer able to obtain an angular speed.

The means for measuring the acceleration may comprise an accelerometer.

The fundamental frequency may be obtained by Fast Fourier Transform followed by a calculation of a maximum in the frequency band obtained after carrying out the Fast Fourier Transform or by phase-locked loop.

The adaptive corrector may be a Linear Variant Parameter corrector.

This Linear Parameter Variant corrector is linear but varies over time, according to measurable parameters. It linearly depends on the variant parameter.

The adaptive corrector may follow the state representation according to the following formula:

$$\begin{cases} x_{k+1} = A(\hat{f}_{vk})x_k + B(\hat{f}_{vk})\varepsilon_k \\ u_k = C(\hat{f}_{vk})x_k + D(\hat{f}_{vk})\varepsilon_k \end{cases}$$

$$f_{min} \le \hat{f}_{vk} \le f_{max}$$

where $x_k$ is the state variable of the corrector, $\varepsilon_k$ is the feedback control error at the input of the corrector, $u_k$ is the digital motor command calculated by the corrector (output of the corrector), $f_{min}$ and $f_{max}$ are two frequencies limiting the fundamental frequency in real-time $\hat{f}_{vk}$ of the disturbing vibrations $\gamma_{vib}$.

The Linear Variant Parameter (LPV) corrector may comprise the following affine state matrices:

$$A(\hat{f}_{vk}) = A_0 + \hat{f}_{vk}A_1$$

$$B(\hat{f}_{vk}) = B_0 + \hat{f}_{vk}B_1$$

$$C(\hat{f}_{vk}) = C_0 + \hat{f}_{vk}C_1$$

$$D(\hat{f}_{vk}) = D_0 + \hat{f}_{vk}D_1$$

where $A_0$, $B_0$, $C_0$, $D_0$, $A_1$, $B_1$, $C_1$, $D_1$ designate matrix gains which are the parameters saved in the memory of software that implements the corrector.

The first axis and the second axis may be perpendicular to each other.

Embodiments of the disclosure also relate to a motorized vehicle such as a helicopter, an aerial or marine vehicle propelled by a propeller or a tracked land vehicle comprising an optronic sight as described hereinabove.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 3:
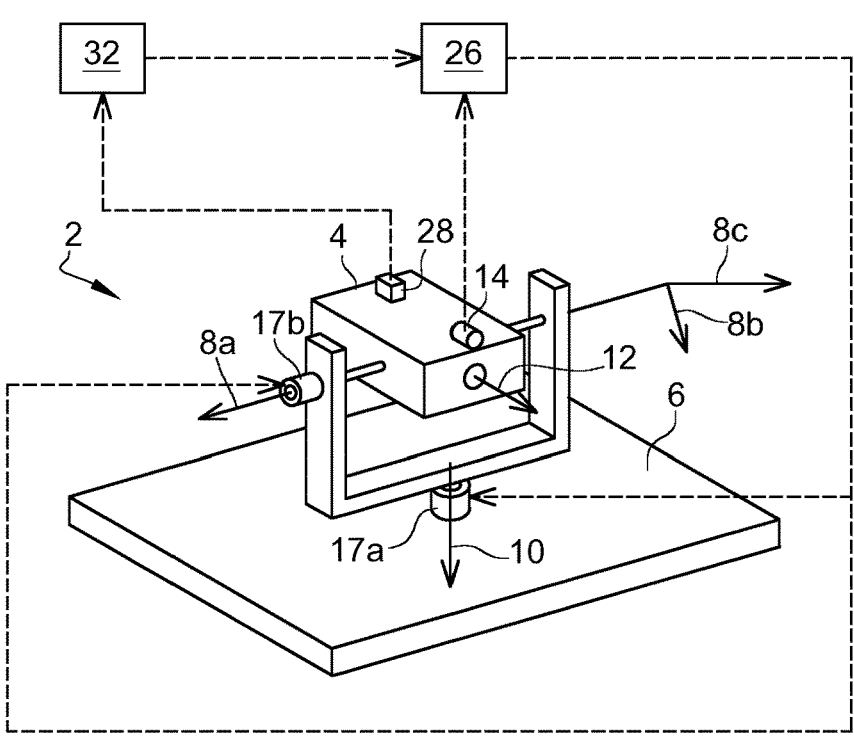
FIG. 3 is a schematic view of an optronic sight according to the disclosure.
Figure 4:
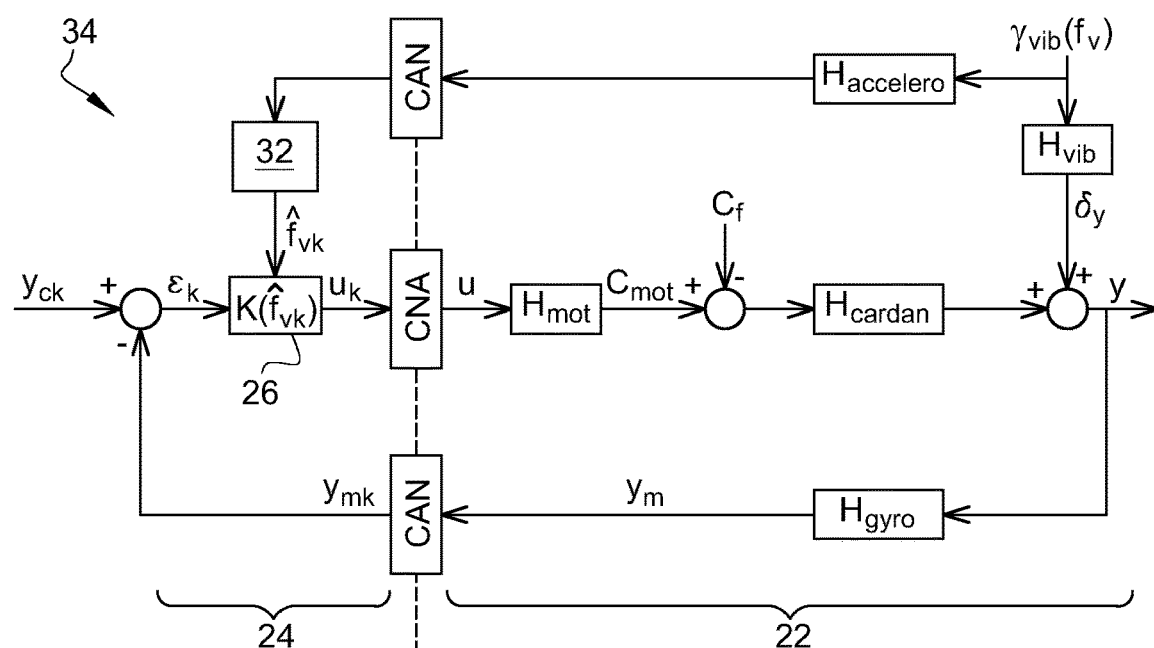
FIG. 4 is a diagram representing the operation of an optronic sight according to the disclosure.

FIGS. 3 and 4 respectively illustrate a schematic view of an optronic sight 2 and a diagram representing the operation of such a sight according to an embodiment of the disclosure. Similarly to the prior art, the optronic sight 2 comprises in particular:

> an aiming module 4 able to be moved about a first axis 8a and a second axis 10 perpendicular to the first axis,
>
> means 17a, 17b for moving the aiming module 4 about the first 8a and second 10 axes,
>
> means 14 for continuously measuring an angular data of the module about the first 8a and second 10 axes.

In the embodiment illustrated in the FIGURES, the first axis 8a and the second axis 10 are perpendicular but it should be understood that the details of embodiments given hereinafter are also applicable to embodiments wherein the axes are not perpendicular and not even secant. The first axis 8a and the second axis 10 may also be secant and not perpendicular.

Figure 1:
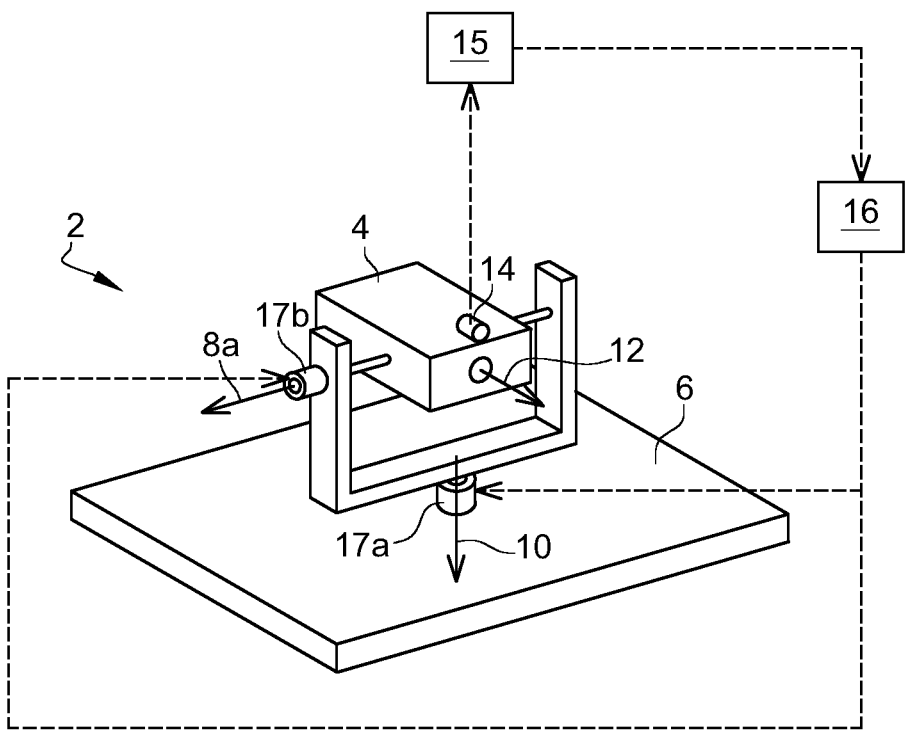
FIG. 1 is a schematic view of an optronic sight of the prior art.
Figure 2:
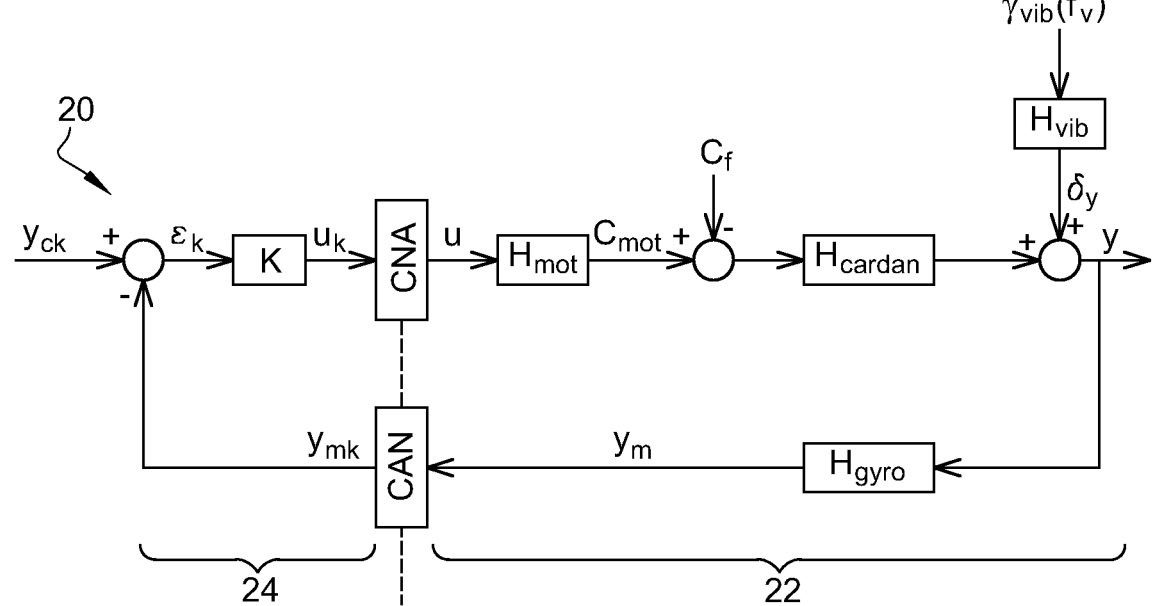
FIG. 2 is a diagram representing the operation of an optronic sight in the prior art.

The optronic sight 2 of FIGS. 3 and 4 differs from the optronic sight 2 presented with reference to FIGS. 1 and 2 and in that, in the feedback control loop 34 according to the present disclosure, at the input of the corrector K, we now find not only the feedback control error $\varepsilon_k$ which depends on the sampled measurement $y_{mk}$ of the angular data but also the fundamental frequency $\hat{f}_{vk}$, varying in real-time, of the disturbing vibrations $\gamma_{vib}$. Hence, this new adaptive corrector $K(\hat{f}_{vk})$ 26 is calculated in order to compensate for the disturbing vibration $\gamma_{vib}(f_v)$ whose fundamental frequency $f_v$ varies over time. For this purpose, means for continuously measuring the acceleration 28 of the aiming module according to the three axes 8a, 8b, 8c of an orthogonal reference frame in the space. These means for continuously measuring the acceleration comprise an accelerometer 28. The transfer function of the accelerometer $H_{accelero}$ allows accounting for the dynamics of the accelerometer. After passing through an Analogue-to-Digital Converter, the fundamental frequency $\hat{f}_{vk}$ associated with the vibratory disturbances $\gamma_{vib}$ is estimated in real-time. The detection means 32 of the fundamental frequency $\hat{f}_{vk}$ is based on two possible techniques: either it is calculated by Fast Fourier Transform, or by a phase-locked loop.

Phase-locked loops conventionally consist of a phase comparator, a loop filter, a voltage-controlled oscillator and a possible frequency divider.

As regards the calculations operated by the adaptive corrector $K(\hat{f}_{vk})$, three techniques can be used: either by using a Linear Parameter Variant (LPV) control, or by means of a symbol corrector, or by a combination of its two types of correctors (LPV and symbol).

In the case of an LPV control corrector, a minimum state representation of the system $K(\hat{f}_{vk})$ is designated by (A, B, C, D) with $A \in R^{n \times n}$, $B \in R^{n \times 1}$, $CE$ $R^{1 \times n}$ and $D \in R$. The software implementation in the form of a state of the adaptive corrector $K(\hat{f}_{vk})$ is done according to the following relationship:

$$\begin{cases} x_{k+1} = A(\hat{f}_{vk})x_k + B(\hat{f}_{vk})\varepsilon_k \\ u_k = C(\hat{f}_{vk})x_k + D(\hat{f}_{vk})\varepsilon_k \end{cases}$$

$$f_{min} \le \hat{f}_{vk} \le f_{max}$$

where $x_K \in R^n$ is the state variable of the adaptive corrector, $\varepsilon_k$ is the feedback control error at the input of the adaptive corrector, $u_k$ is the digital motor control calculated by the adaptive corrector (output of the adaptive corrector), $f_{min}$ and $f_{max}$ are two frequencies limiting the fundamental frequency in real-time $\hat{f}_{vk}$ of the disturbing vibrations $\gamma_{vib}$.

The state matrices (A, B, C, D) are $\hat{f}_{vk}$ affine and are written in the form:

$$A(\hat{f}_{vk}) = A_0 + \hat{f}_{vk}A_1$$

$$B(\hat{f}_{vk}) = B_0 + \hat{f}_{vk}B_1$$

$$C(\hat{f}_{vk}) = C_0 + \hat{f}_{vk}C_1$$

$$D(\hat{f}_{vk}) = D_0 + \hat{f}_{vk}D_1$$

where $A_0$, $B_0$, $C_0$, $D_0$, $A_1$, $B_1$, $C_1$, $D_1$ designate matrix gains which are the parameters saved in the memory of software that implements the adaptive corrector $K(\hat{f}_{vk})$.

Thus, the adaptive corrector $K(\hat{f}_{vk})$ varies according to the fundamental frequency of the spectrum of the lines of the disturbing vibrations $\gamma_{vib}(f_v)$, while guaranteeing the stability of the feedback control loop. This adaptive corrector $K(\hat{f}_{vk})$ allows automatically adapting in real-time (without having to recalculate the entire corrector unlike the prior art) the frequency of the selector filter to be used without any risk of instability, saturation or degradation of the robustness of the feedback control.

The invention claimed is:

1. An optronic sight for a motorized vehicle such as an aerial or marine vehicle propelled by a propeller or a tracked land vehicle, the optronic sight comprising:

an aiming module configured to be moved about a first axis and a second axis not parallel to the first axis, means for moving the aiming module about the first and second axes, means for continuously measuring an angular data of the aiming module about the first and second axes;

a feedback control loop, comprising:

means for continuously measuring the acceleration of the aiming module according to three orthogonal directions of a space; and means for detecting at least one fundamental frequency of the vibratory disturbances generated by the operation of the motorized vehicle, the at least one fundamental frequency being obtained based on the output data of the acceleration measuring means; and an adaptive corrector configured to:

continuously receive as input:

said fundamental frequency; and a discrepancy between an angular setpoint value and said angular data; and output a movement setpoint value to the moving means.

2. The optronic sight of claim 1, wherein the means for continuously measuring the angular data include a gyroscope configured to obtain an angular position or a gyrometer configured to obtain an angular speed.

3. The optronic sight of claim 1, wherein the means for measuring the acceleration comprise an accelerometer.

4. The optronic sight of claim 1, wherein the fundamental frequency is obtained by Fast Fourier Transform followed by a calculation of a maximum in the frequency band obtained after carrying out the Fast Fourier Transform or by phase-locked loop.

5. The optronic sight of claim 1, wherein the adaptive corrector comprises a Linear Variant Parameter corrector.

6. The optronic sight of claim 5, wherein the adaptive corrector follows a state representation according to the following formula:

$$\begin{cases} x_{k+1} = A(\hat{f}_{vk})x_k + B(\hat{f}_{vk})\varepsilon_k \\ u_k = C(\hat{f}_{vk})x_k + D(\hat{f}_{vk})\varepsilon_k \end{cases}$$

$$f_{min} \le \hat{f}_{vk} \le f_{max}$$

where xk is the state variable of the corrector, $\varepsilon\_k$ is the feedback control error at the input of the adaptive corrector, uk is the digital motor command calculated by the adaptive corrector (output of the corrector), fmin and fmax are two frequencies limiting the fundamental frequency in real-time $\hat{f}\_vk$ of the disturbing vibrations $\gamma\_vib$.

7. The optronic sight of claim 5, wherein the Linear Variant Parameter (LPV) corrector comprises the following affine state matrices:

$$A(\hat{f}_{vk}) = A_0 + \hat{f}_{vk}A_1$$

$$B(\hat{f}_{vk}) = B_0 + \hat{f}_{vk}B_1$$

$$C(\hat{f}_{vk}) = C_0 + \hat{f}_{vk}C_1$$

$$D(\hat{f}_{vk}) = D_0 + \hat{f}_{vk}D_1$$

where $A_0$, $B_0$, $C_0$, $D_0$, $A_1$, $B_1$, $C_1$, $D_1$ designate matrix gains which are the parameters saved in the memory of the corrector.

8. The optronic sight of claim 1, wherein the first axis and the second axis are perpendicular to each other.

9. A motorized vehicle, such as an aerial or marine vehicle propelled by a propeller or a tracked land vehicle, comprising an optronic sight according to claim 1.

* * * * *